United States Patent
Yang et al.

(10) Patent No.: US 11,537,255 B2
(45) Date of Patent: Dec. 27, 2022

(54) TOUCH SUBSTRATE, METHOD FOR MANUFACTURING THE SAME, AND TOUCH DISPLAY DEVICE

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Zhongzheng Yang, Beijing (CN); Ming Zhang, Beijing (CN); Qicheng Chen, Beijing (CN); Ting Zeng, Beijing (CN); Qi Gao, Beijing (CN)

(73) Assignees: HEFEI XINSHENG OPTOELECTRONICS TECHNOLOGY CO., LTD., Anhui (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 767 days.

(21) Appl. No.: 16/332,743

(22) PCT Filed: Aug. 29, 2018

(86) PCT No.: PCT/CN2018/102984
§ 371 (c)(1),
(2) Date: Mar. 12, 2019

(87) PCT Pub. No.: WO2019/140916
PCT Pub. Date: Jul. 25, 2019

(65) Prior Publication Data
US 2021/0373686 A1 Dec. 2, 2021

(30) Foreign Application Priority Data
Jan. 19, 2018 (CN) .................. CN201820098214

(51) Int. Cl.
*G06F 3/047* (2006.01)
*G06F 3/041* (2006.01)

(52) U.S. Cl.
CPC .......... *G06F 3/047* (2013.01); *G06F 3/04164* (2019.05); *G06F 2203/04103* (2013.01); *G06F 2203/04111* (2013.01)

(58) Field of Classification Search
CPC ................ G06F 3/047; G06F 3/04164; G06F 2203/04111; G06F 2203/04103; G06F 3/041; H01L 27/32
See application file for complete search history.

(56) References Cited

U.S. PATENT DOCUMENTS

| | | | |
|---|---|---|---|
| 2014/0218322 A1* | 8/2014 | Chung | G06F 3/041 345/173 |
| 2015/0060125 A1* | 3/2015 | Stevenson | G06F 3/0446 174/261 |

(Continued)

FOREIGN PATENT DOCUMENTS

| CN | 201725317 U | 1/2011 |
|---|---|---|
| CN | 103487984 A | 1/2014 |

(Continued)

OTHER PUBLICATIONS

International Search Report and Written Opinion for International Patent Application No. PCT/CN2018/102984, dated Nov. 19, 2018, 12 pages.

*Primary Examiner* — Patrick N Edouard
*Assistant Examiner* — Joseph P Fox
(74) *Attorney, Agent, or Firm* — Kinney & Lange, P.A.

(57) ABSTRACT

A touch substrate, a method for manufacturing a touch substrate, and a touch display device are provided. The touch substrate includes: a base substrate having a first surface; a first over coat layer on the first surface; a first touch electrode on the first over coat layer; and a second over coat (Continued)

layer on the first touch electrode, wherein the first touch electrode is located between the first over coat layer and the second over coat layer, and the second over coat layer covers at least the first touch electrode, and wherein an area of at least one of the first over coat layer and the second over coat layer is less than an area of the first surface in the touch area.

19 Claims, 5 Drawing Sheets

(56) References Cited

U.S. PATENT DOCUMENTS

| | | | |
|---|---|---|---|
| 2015/0277186 A1* | 10/2015 | Zou | G06F 3/0446 345/174 |
| 2016/0004365 A1* | 1/2016 | Huang | G06F 3/0446 345/173 |
| 2016/0048238 A1* | 2/2016 | Qu | G06F 3/044 345/173 |
| 2016/0320876 A1* | 11/2016 | Son | G06F 3/04164 |
| 2018/0081218 A1 | 3/2018 | Wang | |

FOREIGN PATENT DOCUMENTS

| | | |
|---|---|---|
| CN | 105629548 A | 6/2016 |
| CN | 207780749 U | 8/2018 |

\* cited by examiner

TOUCH SUBSTRATE, METHOD FOR MANUFACTURING THE SAME, AND TOUCH DISPLAY DEVICE

CROSS-REFERENCE TO RELATED APPLICATION

This application is a Section 371 National Stage Application of International Application No. PCT/CN2018/102984, filed on Aug. 29, 2018, entitled "TOUCH SUBSTRATE, METHOD FOR MANUFACTURING THE SAME, AND TOUCH DISPLAY DEVICE", which claims priority to Chinese Patent Application No. 201820098214.0 filed on Jan. 19, 2018 with CNIPA, incorporated herein by reference in entirety.

TECHNICAL FIELD

Embodiments of the present disclosure relate to the field of touch or display technology, and in particular, to a touch substrate, a method for manufacturing a touch substrate, and a touch display device.

BACKGROUND

A touch product generally includes multiple OC layers (Over Coat layers) to protect touch electrodes in different layers or isolate them from each other. Each of the OC layers is generally designed in a full layer, and is generally made of organic materials and therefore has poor chemical stability, which makes the touch product have defects frequently.

SUMMARY

Embodiments of the present disclosure provide the following technical solutions:

In an aspect, an embodiment of the present disclosure provides a touch substrate having a touch area, wherein the touch substrate comprises:

a base substrate having a first surface;

a first over coat layer on the first surface;

a first touch electrode on the first over coat layer; and a second over coat layer on the first touch electrode, wherein the first touch electrode is located between the first over coat layer and the second over coat layer, and the second over coat layer covers at least the first touch electrode, and wherein an area of at least one of the first over coat layer and the second over coat layer is less than an area of the first surface in the touch area.

Optionally, an orthographic projection of at least one of the first over coat layer and the second over coat layer on the first surface has a same shape as an orthographic projection of the first touch electrode on the first surface.

Optionally, the first touch electrode is formed by an intersection of a plurality of metal wires and has a grid shape.

Optionally, the first over coat layer comprises a plurality of first strip-shaped portions which intersect with one another and form a grid shape, wherein a width of at least a part of the first strip-shaped portions is greater than a line width of the metal wires.

Optionally, the second over coat layer comprises a plurality of second strip-shaped portions which intersect with one another and form a grid shape, wherein a width of the second strip-shaped portions is greater than a line width of the metal wires.

Optionally, orthographic projections of the first over coat layer and the second over coat layer on the first surface each have a same shape as the orthographic projection of the first touch electrode on the first surface;

wherein the first over coat layer comprises a plurality of first strip-shaped portions which intersect with one another and form a grid shape;

wherein the second over coat layer comprises a plurality of second strip-shaped portions which intersect with one another and form a grid shape; and wherein a width of the second strip-shaped portions, a width of the first strip-shaped portions, and a line width of the metal wires are sequentially decreased.

Optionally, the second over coat layer further covers the first over coat layer.

Optionally, the touch substrate further comprises:

a second touch electrode disposed above the first surface, intersecting with the first touch electrode and insulated from the first touch electrode; and a third over coat layer covering the second touch electrode, the first over coat layer, the first touch electrode, and the second over coat layer.

In another aspect, an embodiment of the present disclosure provides a touch display device, comprising the touch substrate according to any one of the above embodiments.

Optionally, the touch display device further comprises:

a color filter layer on a side of the touch substrate adjacent to the base substrate; or a thin film transistor array layer on a side of the touch substrate adjacent to the base substrate.

In still another aspect, an embodiment of the present disclosure provides a method for manufacturing a touch substrate, the touch substrate having a touch area, wherein the method comprises:

forming a first over coat layer on a first surface of a base substrate;

forming a first touch electrode on the first over coat layer; and forming a second over coat layer covering the first over coat layer and the first touch electrode, wherein an area of at least one of the formed first over coat layer and the formed second over coat layer is less than an area of the first surface in the touch area.

Optionally, the method further comprises:

forming a second touch electrode above the first surface, the second touch electrode intersecting with the first touch electrode and being insulated from the first touch electrode; and forming a third over coat layer covering the second touch electrode, the first over coat layer, the first touch electrode, and the second over coat layer.

Optionally, the forming the first over coat layer on the first surface of the base substrate comprises:

coating a photoresist material on the first surface of the base substrate; and exposing and developing the coated photoresist material to form the first over coat layer on the first surface of the base substrate.

BRIEF DESCRIPTION OF THE DRAWINGS

In order to more clearly illustrate the technical solutions in the embodiments of the present disclosure or in the related art, the accompanying drawings to be used in the embodiments or the related art for description will be briefly described below. Obviously, the drawings referred in the following description merely reflect some of the embodiments of the present disclosure, and other drawings may be obtained from these drawings by those skilled in the art without any creative efforts.

DETAILED DESCRIPTION OF EMBODIMENTS

Figure 1:
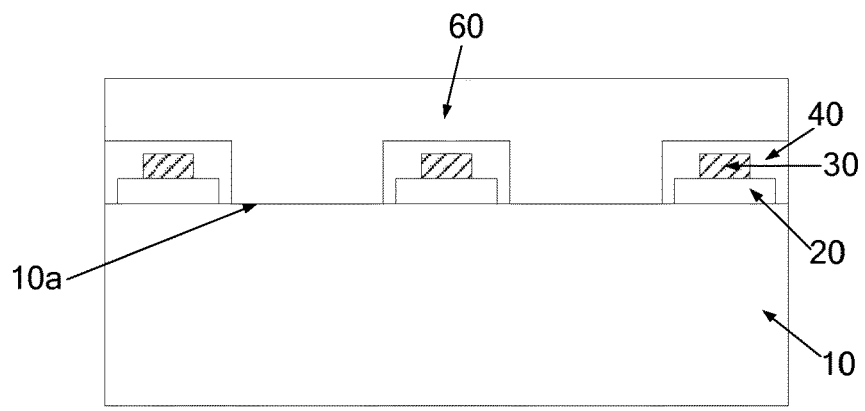
FIG. 1 is a schematic partial cross-sectional structural view of a touch substrate according to an embodiment of the present disclosure.

The technical solutions in the embodiments of the present disclosure will be clearly and completely described with reference to the accompanying drawings in the present disclosure. It is obvious that only a part of the embodiments of the present disclosure, but not all of the embodiments are described. All other embodiments obtained by those skilled in the art based on the embodiments disclosed in the present disclosure without creative efforts fall within the scope of the present disclosure.

It should be noted that all terms (including technical and scientific terms) used in the embodiments of the present disclosure are interpreted as those skilled in the art understand, unless otherwise defined. It should also be understood that terms such as those defined in the ordinary dictionary should be interpreted as having meanings consistent with their meanings in the context of the related art, and should not be interpreted in an idealized or extremely formalized manner, unless explicitly defined herein.

For example, the terms "first", "second", and the like, as used in the specification and claims of the present disclosure, are not intended to indicate any order, quantity, or importance, but are used to distinguish different components. The word "comprise", "include" or the like means that the element or item preceding the word covers the elements or items and equivalents thereof listed behind the word, but rather than excluding other elements or items. The terms indicating orientation or positional relationship, such as "upper/above", "lower/below" and the like, are presented based on the orientation or positional relationship shown in the drawings, and they are merely for the convenience of describing the technical solutions of the present disclosure, rather than indicating or implying that the device or elements referred to must have a particular orientation, be constructed and operated in a particular orientation, therefore they should not be construed as limiting the present disclosure.

The embodiments of the present disclosure provide a touch substrate, a method for manufacturing a touch substrate, and a touch display device, which can improve quality of film deposition of touch electrodes in the touch substrate, and reduce the degree of yellowing and local defects caused by the large overall thickness of the over coat layer and thereby reduce the degree of various defects in the touch product.

As shown in FIG. 1, an embodiment of the present disclosure provides a touch substrate having a touch area. The touch substrate specifically includes a base substrate 10 having a first surface 10$a$. The touch substrate further includes: a first over coat layer 20, a first touch electrode 30, and a second over coat layer 40, which are sequentially disposed on the first surface 10$a$. The first touch electrode 30 is located between the first over coat layer 20 and the second over coat layer 40, and the second over coat layer 40 covers at least the first touch electrode 30. An area of at least one of the first over coat layer 20 and the second over coat layer 40 is less than an area of the first surface 10$a$ in the touch area.

It should be noted:

Firstly, the first touch electrode 30 may be a touch driving electrode (Tx) or a touch sensing electrode (Rx).

The number of the first touch electrodes 30 is usually plural, and they are distributed on the first surface 10$a$ in parallel and spaced apart from each other.

The specific pattern, number, and arrangement of the first touch electrodes 30 may be flexibly designed according to the size of the base substrate 10 and the requirements on the touch precision. They are not limited in the embodiments of the present disclosure.

Secondly, referring to FIG. 1, after the second over coat layer 40 is formed, a second touch electrode opposite to the first touch electrode 30 needs to be formed on the base substrate 10 subsequently.

The first touch electrode and the second touch electrode may be a Tx electrode and an Rx electrode, respectively, or an Rx electrode and a Tx electrode, respectively.

Since the second touch electrode is generally made of metal materials, it is necessary to form the desired shape by a wet etching method. In order to prevent an etching solution from eroding the underlying first touch electrode 30, the above-described second over coat layer 40 needs to cover at least the first touch electrode 30 to protect the underlying first touch electrode 30.

Herein, the above-described "cover" specifically refers to shielding or capping. Referring to FIG. 1, the second over coat layer 40 wraps an upper surface of the first touch electrode 30 away from the first over coat layer 20 and sides connected to the upper surface.

The "upper surface" is opposite to the first over coat layer 20 which functions as a base substrate of the first touch electrode 30.

In addition, the above-described FIG. 1 also illustrates that, when the pattern area of the first over coat layer 20 is also small, the second over coat layer 40 located above it may also cover the first over coat layer 20. However, it is not necessary, and the second over coat layer 40 covers at least the first touch electrode 30.

Thirdly, the base substrate 10 may be a transparent base substrate such as a glass base substrate, and the formed touch substrate may be attached to one side of the display substrate displaying image by an external connection mode;

or the above-described touch substrate may be integrated inside the display device to reduce the overall thickness of the formed product with display and touch functions.

In the related art, taking an OGS (One Glass Solution) type touch product as an example, it generally includes three OC layers (Over Coat layers), wherein the first touch electrode is disposed on a base OC layer (a first OC layer, that is, $OC_0$ layer), a second OC layer (i.e., $OC_1$ layer) serves as an insulating layer to isolate the underlying first touch electrode from the second touch electrode formed subsequently above, and a third OC layer (i.e., $OC_2$ layer) serves as an over coat layer for all of the electrodes.

The designer further found in the research that the adverse effect of the OC layer provided in a full layer on the quality of film deposition of the touch electrode in the related art mainly lies in: the OC layer is generally made of organic materials, and therefore has poor chemical stability, and the underlying $OC_0$ layer or $OC_1$ layer adsorbs gas within the sputtering chamber when the metal film of the touch electrode is deposited thereon.

Since the area of the OC layer applied to the large-sized touch product is also large, a significant deflation phenomenon is generated, which affects the quality of film deposition of the metal film, causes defects of the subsequently formed touch electrodes, such as wire breakage, and affects the accuracy rate of touch.

Based on the above, in the above-described touch substrate provided by the embodiment of the present disclosure, the areas of the first over coat layer 20 and the second over coat layer 40 on both sides of the first touch electrode 30 are changed so that the area of at least one of the two over coat layers is less than the area of the first surface 10a of the base substrate 10 in the touch area, which can effectively improve the problems, like material deflation, yellowing of the OC layer and OC defect due to the over coat layers on both sides of the first touch electrode are provided in the touch area in full layers in the related art. At least to some extent, it improves the quality of film deposition of the touch electrode, and reduces the degree of yellowing and local defects caused by the large overall thickness of the over coat layers and thereby reduces the degree of various defects in the touch product.

Figure 2:
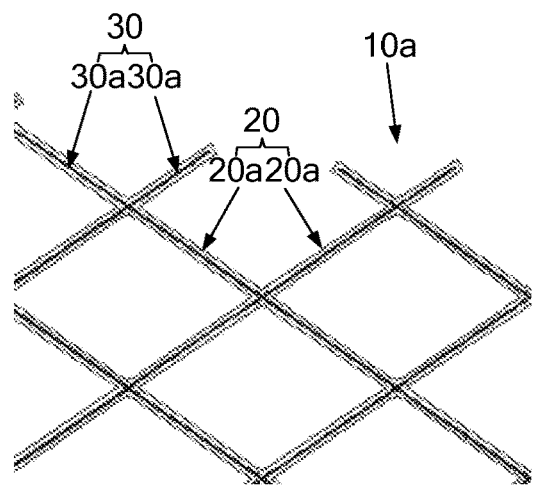
FIG. 2 is a schematic partial planar structural view of a touch substrate according to an embodiment of the present disclosure.

On basis of the above, in order to minimize area proportions of the various over coat layers in the touch area, the pattern of at least one of the first over coat layer 20 and the second over coat layer 40 may be set to match the pattern of the first touch electrode 30, as follows:

As shown in FIG. 2, an orthographic projection of the first over coat layer 20 on the first surface 10a has the same shape as an orthographic projection of the first touch electrode 30 on the first surface 10a, and the two may have different sizes. For example, an area of the orthographic projection of the first over coat layer 20 on the first surface 10a is greater than an area of the orthographic projection of the first touch electrode 30 on the first surface 10a. The second over coat layer 40 is of a full-layer pattern. The portion shown in dark black in the figure is the first touch electrode 30, and the portion shown in light gray in the figure is the first over coat layer 20.

Figure 3:
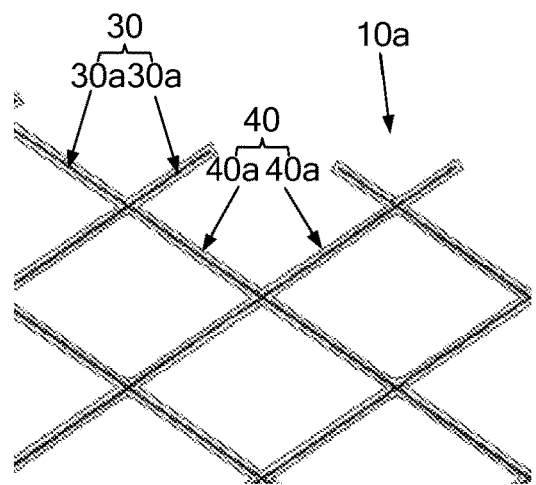
FIG. 3 is a schematic partial planar structural view of a touch substrate according to another embodiment of the present disclosure.

Alternatively, as shown in FIG. 3, an orthographic projection of the second over coat layer 40 on the first surface 10a has the same shape as the orthographic projection of the first touch electrode 30 on the first surface 10a, and the two may have different sizes. For example, an area of the orthographic projection of the second over coat layer 40 on the first surface 10a is greater than the area of the orthographic projection of the first touch electrode 30 on the first surface 10a. The first over coat layer 20 is of a full-layer pattern. The portion shown in dark black in the figure is the first touch electrode 30, and the portion shown in light gray in the figure is the second over coat layer 40.

Figure 4:
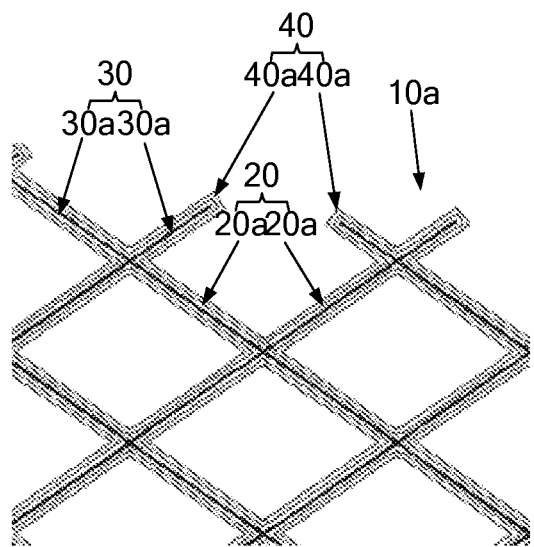
FIG. 4 is a schematic partial planar structural view of a touch substrate according to still another embodiment of the present disclosure.

Alternatively, as shown in FIG. 4, the orthographic projection of the first over coat layer 20 on the first surface 10a has the same shape as the orthographic projection of the first touch electrode 30 on the first surface 10a; and the orthographic projection of the second over coat layer 40 on the first surface 10a has the same shape as the orthographic projection of the first touch electrode 30 on the first surface 10a. The three have different sizes. For example, the area of the orthographic projection of the second over coat layer 40 on the first surface 10a is greater than the area of the orthographic projection of the first over coat layer 20 on the first surface 10a, and the area of the orthographic projection of the first over coat layer 20 on the first surface 10a is greater than the area of the orthographic projection of the first touch electrode 30 on the first surface 10a. The portion shown in dark black in the figure is the first touch electrode 30, the inner portion shown in light gray is the first over coat layer 20, and the outer portion shown in light gray is the second over coat layer 40.

The above "shape" means an existence or representation of a particular thing or substance, such as a rectangle or a square. The expression that the two have the same shape means that the two have the same representation in outline, for example, they are both rectangular or square, but the sizes are not limited.

Herein, referring to FIG. 2 to FIG. 4, taking the pattern of the first touch electrode 30 specifically having a grid shape as an example, the orthographic projection of the first touch electrode on the first surface is also of a grid shape, and the orthographic projection of at least one of the corresponding first over coat layer 20 and second over coat layer 40 on the first surface is also of a grid shape, i.e., the pattern of at least one of the first over coat layer 20 and the second over coat layer 40 also specifically has a grid shape.

It should be noted that the specific pattern of the first touch electrode 30 is not limited in the embodiments of the present disclosure, as long as the pattern of at least one of the first over coat layer 20 and the second over coat layer 40 is matched with the pattern of the first touch electrode 30 in the middle.

In the above-described FIG. 2, taking the pattern of the first touch electrode 30 having a grid shape as an example, since the first touch electrode 30 is located on the first over coat layer 20, the pattern area of the first over coat layer 20 may be equal to or greater than the pattern area of the first touch electrode 30 above it. FIG. 2 is exemplarily represented by taking an example in which the pattern area of the first over coat layer 20 is slightly greater than the pattern area of the first touch electrode 30.

In the above-described FIG. 3, since the second over coat layer 40 covers at least the underlying first touch electrode 30, that is, the upper surface of the first touch electrode 30 away from the first over coat layer 20 and the sides connected to the upper surface are wrapped, the pattern area of the second over coat layer 40 is greater than the pattern area of the underlying first touch electrode 30 below it. FIG. 3 is exemplarily represented by taking an example in which the pattern area of the second over coat layer 40 is slightly greater than the pattern area of the first touch electrode 30.

The pattern of the above-described first touch electrode 30 is of a grid shape, that is, it is a metal grid, which can further improve the touch precision.

Specifically, referring to FIG. 2, the above-described first touch electrode 30 is formed by an intersection of a plurality of metal wires 30a and has a grid shape.

Herein, in the above-described FIG. 2, it only illustrates a part of the grid shape formed by the intersection of the plurality of metal wires 30a. The specific number and angle of intersection of the metal wires 30a are not limited in the embodiments of the present disclosure, and they may be flexibly arranged based on the specific size of the product and the requirements on the touch precision.

Further, referring to FIG. 2, the first over coat layer 20 matching with the pattern of the first touch electrode 30 includes a plurality of first strip-shaped portions 20a which intersect with one another and form a grid shape; wherein a width of at least a part of the first strip-shaped portions 20a is greater than a line width of the metal wires 30a. Since the pattern of the first touch electrode 30 has a grid shape, the pattern of the corresponding first over coat layer 20 also has a grid shape. Since the first touch electrode 30 is disposed on the first over coat layer 20, the orthographic projection of the first strip-shaped portion 20a on the first surface 10a completely covers the orthographic projection of the corresponding metal wire 30a on the first surface 10a.

Herein, in a vertical direction, the regions where the first strip-shaped portions 20a intersect correspond to the regions where the metal wires 30a intersect.

Herein, since the metal wires are usually formed by a process of depositing a metal film layer and then performing a pattern etching, the line width is small. If the width of the corresponding strip-shaped portion located below is the same as the line width of the metal wire, it is easy to cause a defect of wire breakage when the metal film layer deposited on the surface of the strip-shaped portion is etched.

Accordingly, in the embodiments of the present disclosure, it is further provided that the width of at least a part of the first strip-shaped portions 20a is greater than the line width of the metal wires 30a, to avoid the defect of wire breakage.

Exemplarily, the width of the first strip-shaped portions 20a in one direction constituting the grid-shaped structure may be set to be greater than the line width of the metal wires 30a; alternatively, the widths of the first strip-shaped portion 20a in two intersecting directions may be set to be both greater than the line width of the metal wires 30a.

It should be noted that the width of the first strip-shaped portion 20a and the "width" of the strip-shaped portion appearing hereinafter refer to a dimension in a plane in which the strip-shaped portion is located, in a direction perpendicular to an extending direction of the strip-shaped portion.

Further, referring to FIG. 3, the second over coat layer 40 matching with the pattern of the first touch electrode 30 includes a plurality of second strip-shaped portions 40a which intersect with one another and form a grid shape; wherein a width of the second strip-shaped portions 40a is greater than the line width of the metal wires 30a.

Since the pattern of the first touch electrode 30 has a grid shape, the pattern of the corresponding second over coat layer 40 also has a grid shape. Since the second over coat layer 40 covers at least the first touch electrode 30, the orthographic projection of the second strip-shaped portion 40a on the first surface 10a completely covers the orthographic projection of the corresponding underlying metal wire 30a on the first surface 10a.

Herein, in a vertical direction, the regions where the second strip-shaped portions 40a intersect correspond to the regions where the metal wires 30a intersect.

Herein, since the second over coat layer 40 needs to cover at least the underlying first touch electrode 30, the width of the second strip-shaped portions 40a needs to be greater than the line width of the metal wires 30a.

Further, referring to FIG. 4, when the patterns of the first over coat layer 20 and the second over coat layer 40 are matched with the grid shape of the first touch electrode 30, the second over coat layer 40 may be set to further cover the first over coat layer 20, to improve insulation protection for the first touch electrode 30. Moreover, since the pattern area of the second over coat layer 40 is large, the preparation difficulty for patterning the second over coat layer 40 can be reduced.

Specifically, referring to FIG. 4, the first over coat layer 20 includes a plurality of first strip-shaped portions 20a which intersect with one another and form a grid shape; and the second over coat layer 40 includes a plurality of second strip-shaped portions 40a which intersect with one another and form a grid shape.

The width of the second strip-shaped portions 40a, the width of the first strip-shaped portions 20a, and the line width of the metal wires 30a are sequentially decreased to realize the effect that the second over coat layer 40 covers the underlying first touch electrode 30 and first over coat layer 20 sequentially.

Exemplarily, when the width of the first strip-shaped portions 20a is expanded (i.e., increased) relative to the line width of the metal wires 30a by about 10 μm each side, and the width of the second strip-shaped portions 40a is expanded (i.e., increased) relative to the width of the first strip-shaped portions 20a by about 5 μm each side, compared with the solution in the related art that the $OC_0$ and $OC_1$ layers are disposed in the touch area in full layers, the size parameter of the each-side expansion of the over coat layers may realize that the first over coat layer 20 and the second over coat layer 40 are absent in about 85% of the area of the touch area, which significantly reduces the overall thickness of the OC layers laminated in the touch area, and significantly improve the defects such as poor quality of film deposition of the touch electrode, OC material yellowing, local Mura and the like.

Figure 5:
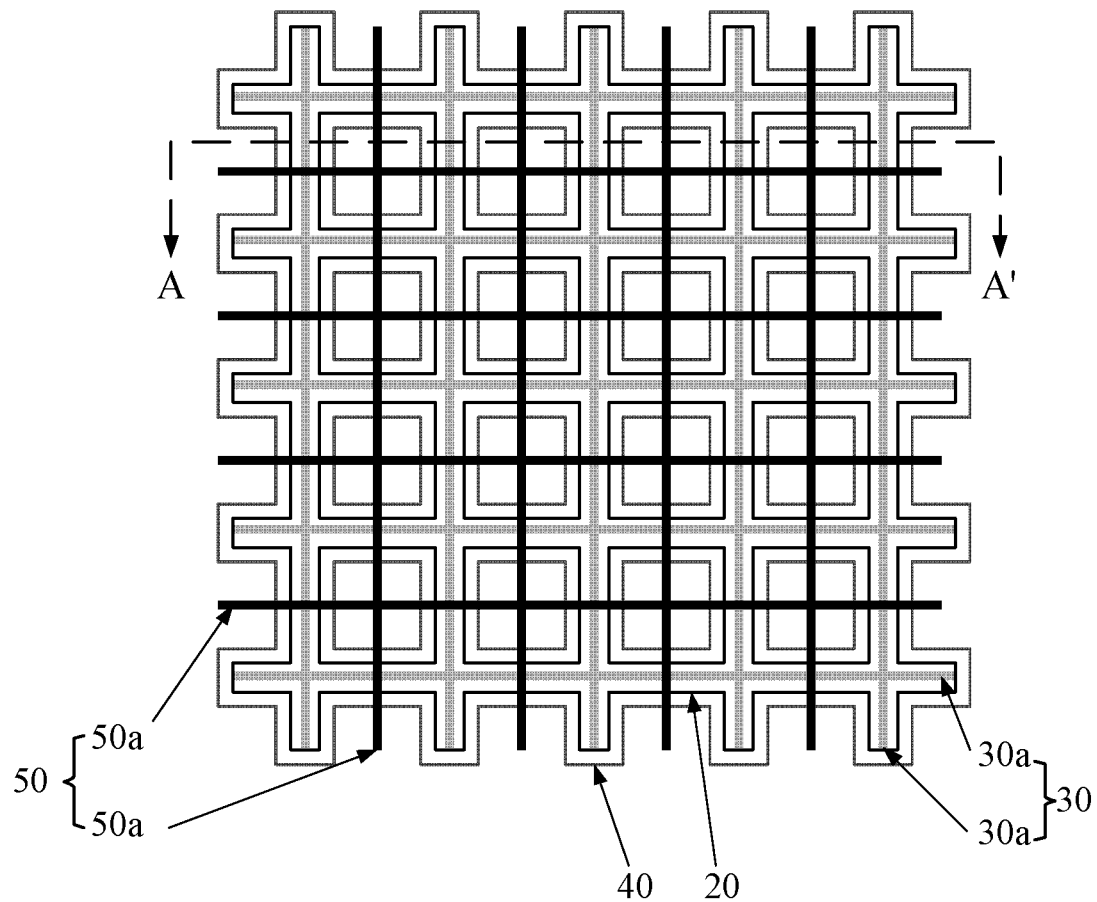
FIG. 5 is a schematic planar structural view showing an intersection region of a first touch electrode and a second touch electrode in a touch substrate according to an embodiment of the present disclosure.
Figure 6:
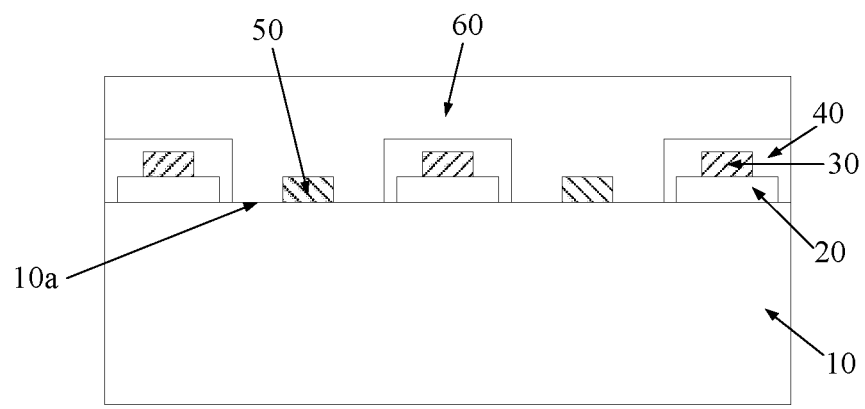
FIG. 6 is a schematic cross-sectional structural view of the touch substrate of FIG. 5 taken along the section A-A'.

On basis of the above, as shown in FIG. 5 and FIG. 6, the above-described touch substrate further includes: a second touch electrode 50 disposed above the first surface 10a, intersecting the first touch electrode 30 and insulated from the first touch electrode; and a third over coat layer 60 covering the second touch electrode 50, the first over coat layer 20, the first touch electrode 30, and the second over coat layer 40.

It should be noted that the number of the second touch electrodes 50 is also usually plural, and they are distributed on the first surface 10a in parallel and spaced apart from each other.

Generally, when the first touch electrode 30 is of a metal grid, the corresponding second touch electrode 50 is also of a metal grid.

The metal wires 50a constituting the second touch electrode 50 intersect with the metal wires 30a constituting the first touch electrode 30 to form various touch points.

The specific pattern, number, and the arrangement of the second touch electrodes 50 may be flexibly designed according to the size of the base substrate 10 and the requirements on the touch precision. They are not limited in the embodiments of the present disclosure.

Figure 8:
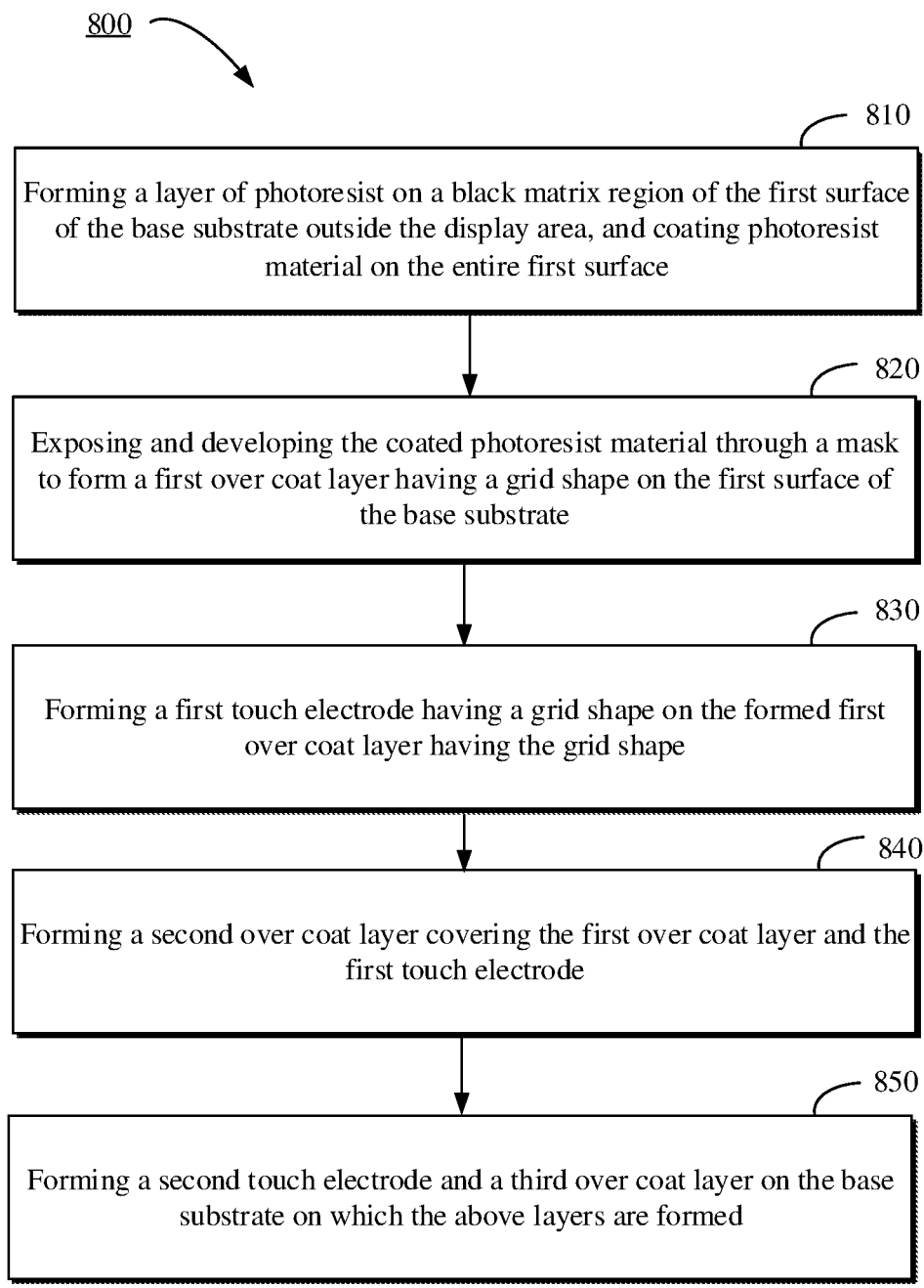
FIG. 8 shows a flowchart of a method for manufacturing a touch substrate according to an embodiment of the present disclosure.

Next, as shown in FIG. 8, taking the pattern of the touch electrodes having a grid shape as an example, that is, taking the touch electrodes being of a metal grid as an example, a method 800 for manufacturing the above-described touch substrate is provided:

Step 810: forming a layer of photoresist on a black matrix region (i.e., a peripheral frame region) of the first surface 10a of the base substrate outside the display area, and coating photoresist material (i.e., photoresist) on the entire first surface 10a.

Figure 7:
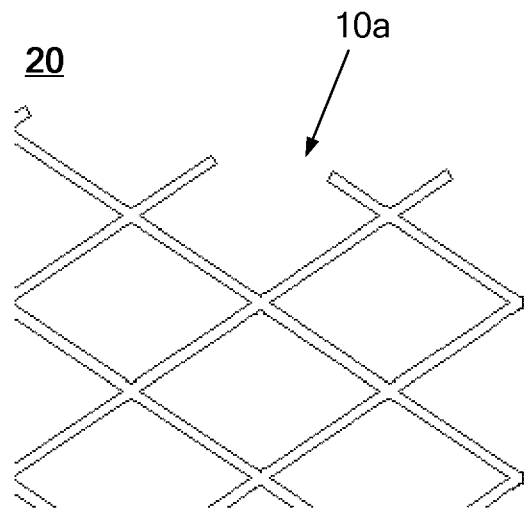
FIG. 7 is a schematic partial planar structural view of a first over coat layer formed by a step (2) in a preparation process of a touch substrate according to another embodiment of the present disclosure.

Step 820, as shown in FIG. 7, exposing and developing the coated photoresist material through a mask to form a first over coat layer 20 having a grid shape on the first surface 10a of the base substrate. Strip-shaped portions of the grid-shaped first over coat layer 20 in each direction are expanded each side relative to a line width of a grid-shaped first touch electrode 30 to be formed later by about 10 μm, metal wires 30a of the first touch electrode 30 are located in the top and middle of the strip-shaped portions of the first over coat layer 20.

Herein, the photoresist material is used to make the OC layers, the corresponding pattern may be directly formed by exposure and development without the process of etching, thereby simplifying the preparation process. Of course, the OC layers may also adopt other transparent insulating materials, which is not limited in the embodiments of the present disclosure. In the present disclosure, only one possible implementation is provided.

Alternatively, the forming the first over coat layer on the first surface of the base substrate may be accomplished by other patterning processes, for example, the first over coat layer having a desired shape may be formed on the first surface of the base substrate by printing.

Step 830: referring to FIG. 2, forming a first touch electrode 30 having a grid shape on the formed first over coat layer 20 having the grid shape, i.e., a first touch electrode layer;

The first strip-shaped portions 20a vertically correspond to the metal wires 30a of the corresponding first touch electrode 30;

Step 840: referring to FIG. 4, forming a second over coat layer 40 covering the first over coat layer 20 and the first touch electrode 30. The second strip-shaped portions 40a and the underlying first strip-shaped portions 20a, the metal wires 30a vertically correspond to each other; a width of the second strip-shaped portions 40a is expanded each side relative to the width of the first strip-shaped portions 20a formed as described above by about 10 μm, the metal wires 30a of the first touch electrode 30 are located in the bottom and middle of the second strip-shaped portions 40a of the second over coat layer 40.

Step 850: forming a second touch electrode (i.e., a second touch electrode layer) and a third over coat layer on the base substrate on which the above layers are formed. The specific preparation process of each layer may use the OGS preparation process of the metal grid in the related art, which is not described in detail in the embodiments of the present disclosure.

It should be noted that the first over coat layer, the first touch electrode, the second over coat layer, the second touch electrode, and the third over coat layer may be achieved by using existing processes, including but not limited to laser etching, printing, and the like.

In this way, compared with the solution in the related art that the $OC_0$ and $OC_1$ layers are disposed in the touch area in full layers, the touch substrate provided by the embodiments of the present disclosure may realize that the first over coat layer 20 and the second over coat layer 40 are absent in about 85% of the area of the touch area, which significantly reduces the overall thickness of the OC layers laminated in the touch area, and significantly improve the defects such as poor quality of film deposition of the touch electrode, OC material yellowing, local Mura and the like.

Figure 9:
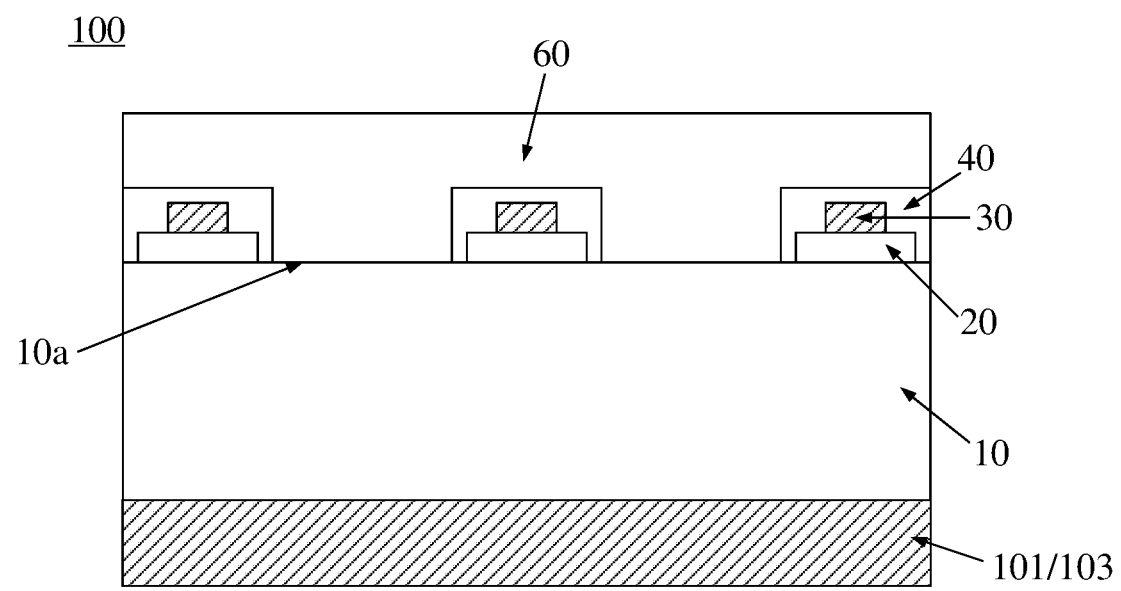
FIG. 9 is a schematic partial cross-sectional structural view of a touch display device according to an embodiment of the present disclosure.

An embodiment of the present disclosure further provides a touch display device 100, including the touch substrate provided in the above embodiments, as shown in FIG. 9.

The touch display device 100 may be an external-connection touch display device, that is, including a display panel, and the touch substrate is disposed on one side of a display panel displaying image. The display panel may be an LCD (Liquid Crystal Display) panel or an OLED (Organic Light-Emitting Display) panel. The display area of the display panel may partially or completely overlap with the touch area of the touch substrate.

Specifically, the above-described touch display device 100 further includes: a color filter layer 101 disposed on a side of the touch substrate adjacent to the base substrate 10, as shown in FIG. 9. In some embodiments, the color filter layer and the touch electrodes and the over coat layers on the touch substrate share the same base substrate, and the color filter layer may be disposed on the same side of the base substrate as the touch electrodes or the like, or they may be respectively located in both sides of the base substrate.

Alternatively, the above-described touch display device 100 further includes: a thin film transistor array layer 103 disposed on a side of the touch substrate adjacent to the base substrate 10, as shown in FIG. 9. In some embodiments, the thin film transistor array layer and the touch electrodes and the over coat layers on the touch substrate share the same base substrate, and the thin film transistor array layer may be disposed on the same side of the base substrate as the touch electrodes or the like, or they may be respectively located in both sides of the base substrate.

The above-described touch display device may specifically be any product or component having a display and touch function, such as a display, a television, a digital photo frame, a mobile phone, a tablet computer, a navigator, and the like.

The above only refers to the specific embodiments of the present disclosure, but the scope of the present disclosure is not limited thereto. Any changes or substitutions made by those skilled in the art without departing from the spirit of the present disclosure should be covered within the scope of the present disclosure. Therefore, the scope of the present disclosure should be determined by the scope of the appending claims.

What is claimed is:

1. A touch substrate having a touch area, wherein the touch substrate comprises:
 a base substrate having a first surface;
 a first over coat layer on the first surface;
 a first touch electrode directly on the first over coat layer; and
 a second over coat layer on the first touch electrode, wherein the first touch electrode is located between the first over coat layer and the second over coat layer,
 wherein the second over coat layer wraps an upper surface of the first touch electrode away from the first over coat layer and opposite side surfaces connected to the upper surface of the first touch electrode, and wraps an upper surface, other than a part of the upper surface occupied by the first touch electrode, of the first over coat layer away from the base substrate and opposite side surfaces connected to the upper surface of the first over coat layer, wherein an area of the first over coat layer and an area of the second over coat layer are less than an area of the first surface in the touch area, wherein cross-sections of the first over coat layer, the first touch electrode and the second over coat layer in a direction perpendicular to the base substrate have a common axis of symmetry, and wherein the base substrate includes areas not covered by the second over coat layer between adjacent sections of the second over coat layer.

2. The touch substrate according to claim 1, wherein an orthographic projection of at least one of the first over coat layer and the second over coat layer on the first surface has a same shape as an orthographic projection of the first touch electrode on the first surface.

3. A touch display device, comprising the touch substrate according to claim 2.

4. The touch display device according to claim 3, wherein the touch display device further comprises:
a color filter layer on a side of the touch substrate adjacent to the base substrate; or
a thin film transistor array layer on a side of the touch substrate adjacent to the base substrate.

5. The touch substrate according to claim 2, wherein the first touch electrode is formed by an intersection of a plurality of metal wires and has a grid shape.

6. The touch substrate according to claim 5, wherein the second over coat layer comprises a plurality of second strip-shaped portions which intersect with one another and form a grid shape, wherein a width of the second strip-shaped portions is greater than a line width of the metal wires.

7. The touch substrate according to claim 5, wherein orthographic projections of the first over coat layer and the second over coat layer on the first surface each have a same shape as the orthographic projection of the first touch electrode on the first surface;
wherein the first over coat layer comprises a plurality of first strip-shaped portions which intersect with one another and form a grid shape;
wherein the second over coat layer comprises a plurality of second strip-shaped portions which intersect with one another and form a grid shape; and
wherein a width of the second strip-shaped portions, a width of the first strip-shaped portions, and a line width of the metal wires are sequentially decreased.

8. A touch display device, comprising the touch substrate according to claim 5.

9. The touch display device according to claim 8, wherein the touch display device further comprises:
a color filter layer on a side of the touch substrate adjacent to the base substrate; or a thin film transistor array layer on a side of the touch substrate adjacent to the base substrate.

10. The touch substrate according to claim 5, wherein the first over coat layer comprises a plurality of first strip-shaped portions which intersect with one another and form a grid shape, wherein a width of at least a part of the first strip-shaped portions is greater than a line width of the metal wires.

11. The touch substrate according to claim 10, wherein the second over coat layer comprises a plurality of second strip-shaped portions which intersect with one another and form a grid shape, wherein a width of the second strip-shaped portions is greater than a line width of the metal wires.

12. A touch display device, comprising the touch substrate according to claim 10.

13. The touch display device according to claim 12, wherein the touch display device further comprises:
a color filter layer on a side of the touch substrate adjacent to the base substrate; or a thin film transistor array layer on a side of the touch substrate adjacent to the base substrate.

14. The touch substrate according to claim 1, wherein the touch substrate further comprises:
a second touch electrode disposed above the first surface, intersecting with the first touch electrode and insulated from the first touch electrode; and
a third over coat layer covering the second touch electrode, the first over coat layer, the first touch electrode, and the second over coat layer.

15. A touch display device, comprising the touch substrate according to claim 1.

16. The touch display device according to claim 15, wherein the touch display device further comprises:
a color filter layer on a side of the touch substrate adjacent to the base substrate; or
a thin film transistor array layer on a side of the touch substrate adjacent to the base substrate.

17. A method for manufacturing a touch substrate, the touch substrate having a touch area, wherein the method comprises:
forming a first over coat layer on a first surface of a base substrate;
forming a first touch electrode directly on the first over coat layer; and
forming a second over coat layer covering the first over coat layer and the first touch electrode, wherein the second over coat layer wraps an upper surface of the first touch electrode away from the first over coat layer and opposite side surfaces connected to the upper surface of the first touch electrode, and wraps an upper surface, other than a part of the upper surface occupied by the first touch electrode, of the first over coat layer away from the base substrate and opposite side surfaces connected to the upper surface of the first over coat layer,
wherein an area of the formed first over coat layer and an area of the formed second over coat layer are less than an area of the first surface in the touch area,
wherein cross-sections of the first over coat layer, the first touch electrode and the second over coat layer in a direction perpendicular to the base substrate have a common axis of symmetry, and
wherein the base substrate includes areas not covered by the second over coat layer between adjacent sections of the second over coat layer.

18. The method according to claim 17, wherein the method further comprises:
forming a second touch electrode above the first surface, the second touch electrode intersecting with the first touch electrode and being insulated from the first touch electrode; and
forming a third over coat layer covering the second touch electrode, the first over coat layer, the first touch electrode, and the second over coat layer.

19. The method according to claim 17, wherein the forming the first over coat layer on the first surface of the base substrate comprises:
coating a photoresist material on the first surface of the base substrate; and exposing and developing the coated photoresist material to form the first over coat layer on the first surface of the base substrate.

* * * * *